Sept. 27, 1966   S. HAMILTON   3,274,832
DIGITAL TEMPERATURE MEASUREMENT AND DISPLAY SYSTEM
Filed Oct. 7, 1963   5 Sheets-Sheet 4

INVENTOR
Sanborn Hamilton

Sept. 27, 1966      S. HAMILTON      3,274,832
DIGITAL TEMPERATURE MEASUREMENT AND DISPLAY SYSTEM
Filed Oct. 7, 1963      5 Sheets-Sheet 5

INVENTOR
Sanborn Hamilton

United States Patent Office 3,274,832
Patented Sept. 27, 1966

3,274,832
DIGITAL TEMPERATURE MEASUREMENT AND DISPLAY SYSTEM
Sanborn Hamilton, Kane, Ill., assignor to Riverbank Laboratories, Geneva, Ill.
Filed Oct. 7, 1963, Ser. No. 316,484
18 Claims. (Cl. 73—339)

This invention relates to a temperature measurement system wherein display and measurement is made directly using digital information.

Temperature measurement today is conventionally accomplished by use of thermometers, resistance thermometers or thermocouples. Interpolation of data, non-linearity correction and non-digital display is the practice. Digital display systems exist, however, accuracy of present systems is seldom better than 0.3 percent, because initial readings are generally in terms of voltage or resistance and a transfer of data into digital information is required as well as correction for sensor non-linearity.

A definite need exists in industry for temperature measuring systems having 0.01 percent accuracy with direct digitial display readings. Modern industry needs such accuracy in many applications, and digital display is highly desirable for fast production, laboratory operations and data print-out requirements.

One object of this invention is to provide apparatus measuring temperature within 0.01 percent accuracy having direct digital display of temperature.

Another object of this invention is to provide a direct digital display of temperature without conversion of data from, say, analog to digital form.

Another object of this invention is to incorporate in the apparatus a special period counter system for maintaining direct digital temperature values.

A further object of this invention is to provide a system of actual temperature determination in proportion to rate of temperature change.

A further object of this invention is to establish a flexible system for this form of measurement and the features explained wherein equipment performing these various features can be switched ON or plugged in depending on accuracy requirements, response speed requirements, cost limitations and operational requirements.

Other objects and advantages will become apparent as the following description proceeds, taken in conjunction with the accompanying drawings.

Figure 4:
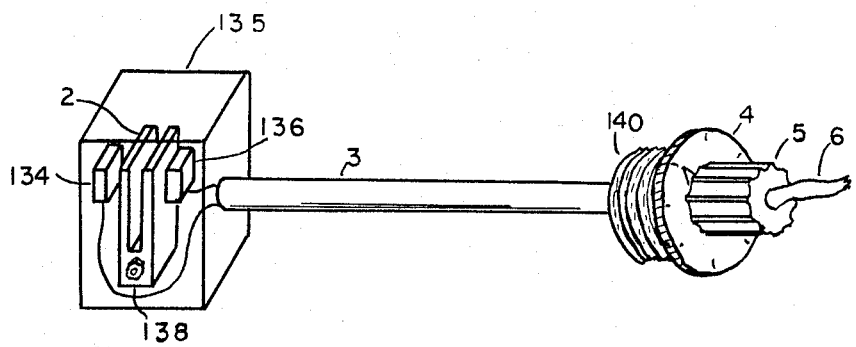
Figure 5:
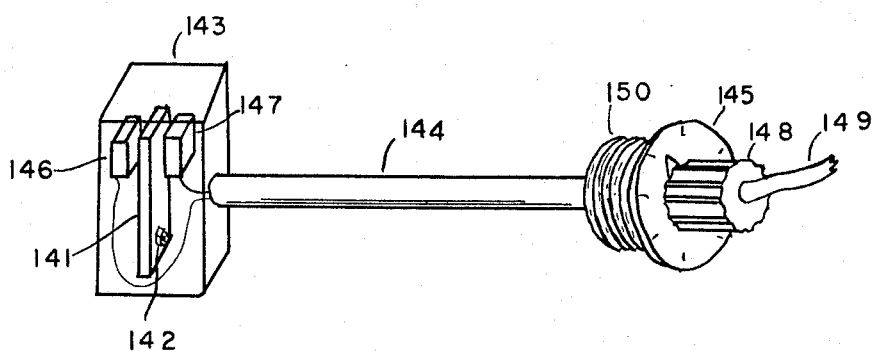

FIGURES 4 and 5 show possible layouts for the transducer. A tuning fork is shown in FIGURE 4. A reed is shown in FIGURE 5.

Figure 6:
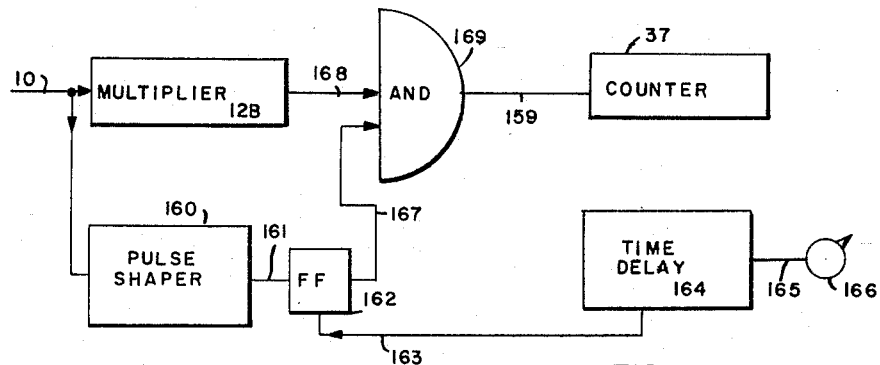

FIGURE 6 shows a block diagram of a multiplier-control system for maintaining high accuracy of counting.

Figure 8:
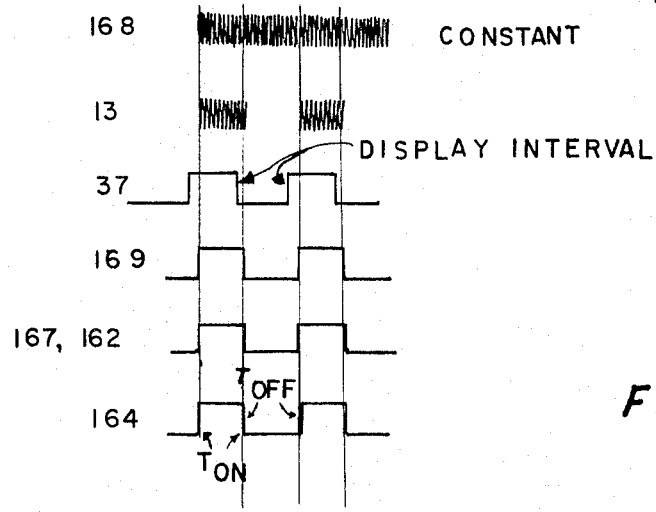
Figure 7:
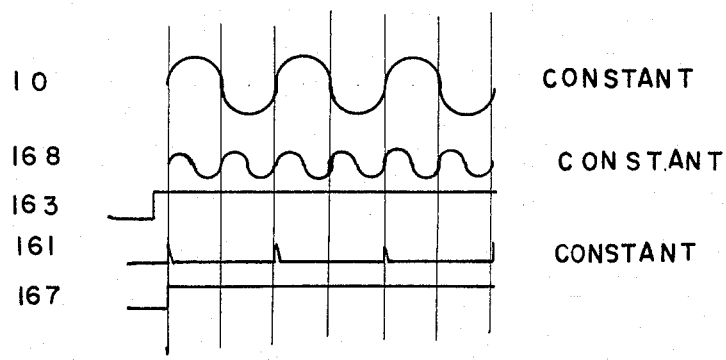

FIGURES 7 and 8 show the sequence of performance of units in FIGURE 6.

Figure 3:
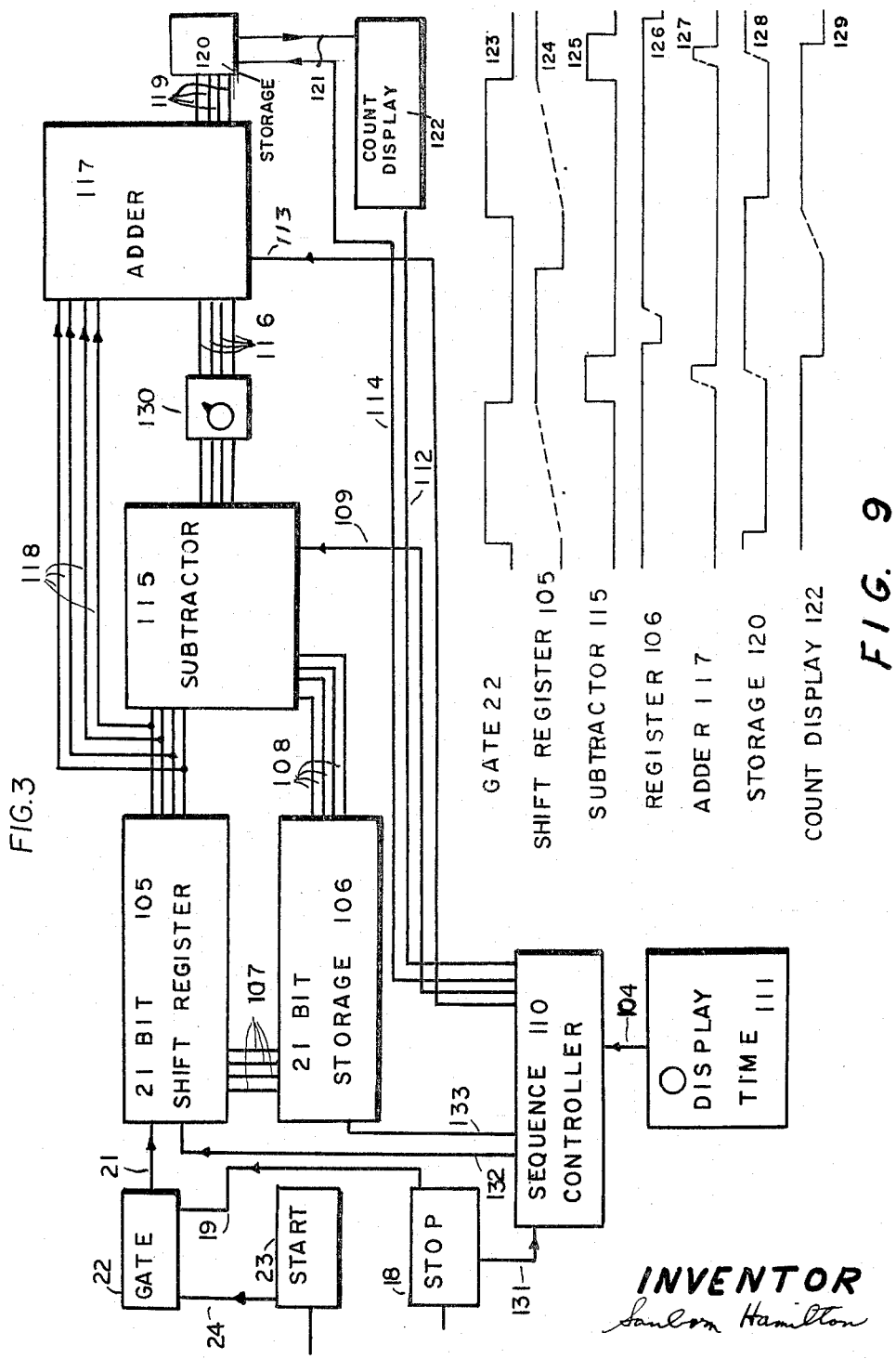
FIGURE 3 shows the rate computer system.

FIGURE 9 shows the waveform sequence for the rate computer system in FIGURE 3.

Figure 1:
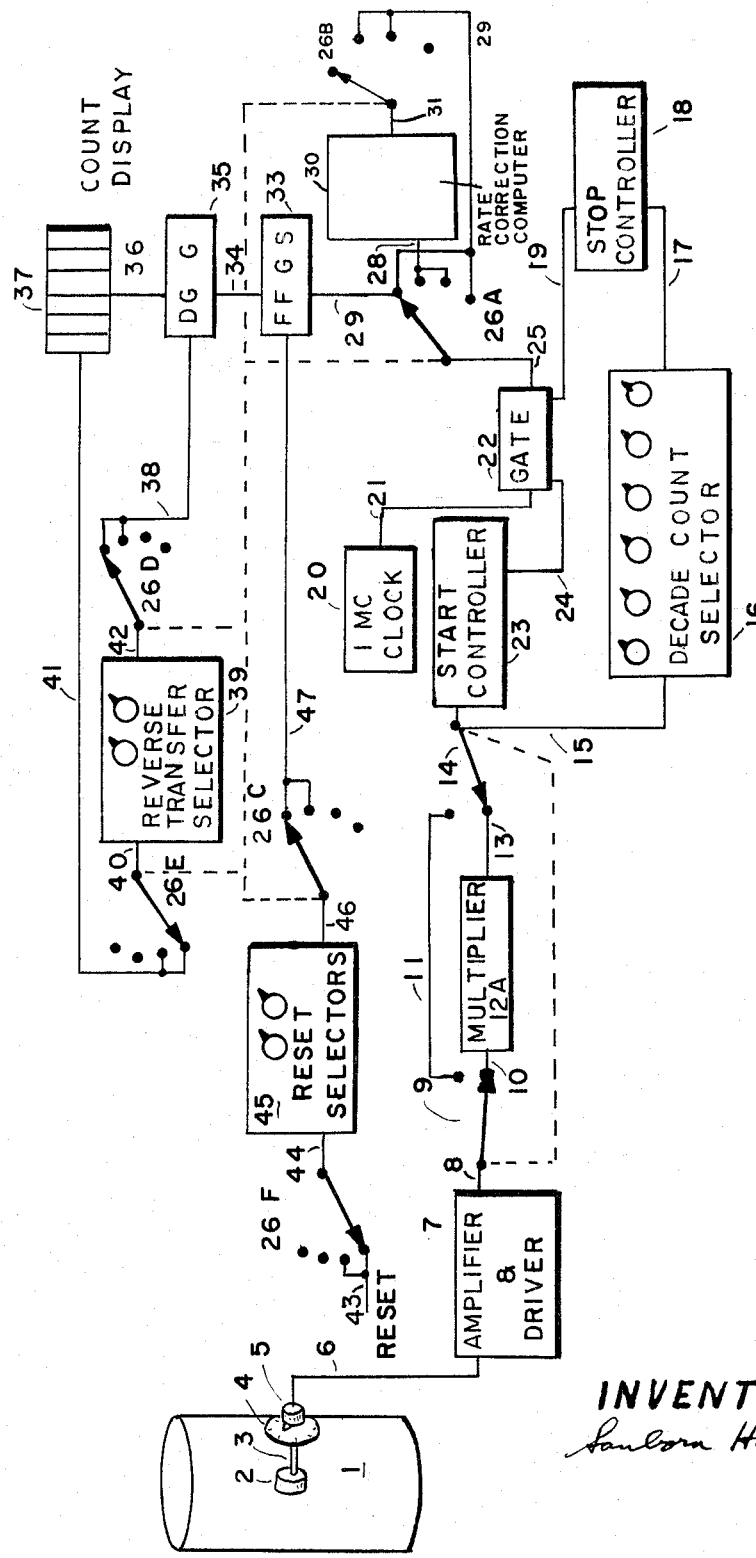
FIGURE 1 shows the overall block diagram of sections of this apparatus and designates means for switching ON various sections depending on need.

Referring first to FIGURE 1, the problem is to measure the temperature in the gas or liquid filled container 1. Transducer 2 is mounted within container 1 and probe stem 3 is connected to the wall of the container. Dial 4 and knob pointer 5 are located outside the container and manually operable to adjust the "tilt" of gravity sensitive vibrating transducers. Dail 4 can best be calibrated in degrees of temperature correction. A typical fork will shift its frequency by 130 parts per million which is equivalent to 0.7 degrees C. when titlted through 180 degrees with respect to earth's gravity. Numerous other vibrating components used as frequency generators are gravity sensitive. Reeds are an example. This tilt calibration technique is not limited to application with forks. This shift remains constant regardless of temperature. By providing this feature of tilt-calibration, a simple means of fork and counter calibration can be provided. Flexible cable 6 allows rotation of the transducer. A drive and pickup circuit 7 is needed for operation of the transduce. Amplifier 7 can be comprised of a 200 gain amplifier of 500 ohms .1 volt input and 20 volt output characteristics for connection with drive and pickup magnetic coils within transducer 2.

Amplifier 7 can be mounted within the probe 2 as a part of the transducer depending on size, mass, thermal response and maximum temperature tolerance. The use of the word transducer in the explanation herein and claims may include regenerative amplifier 7 as a part of the meaning for the word: transducer; as well as including the vibrating mass, drive and pickup elements and housing.

Multiplier 12A increases the frequency from transducer 2 depending on required system accuracy. Switches 9 and 14 show a method by which this multiplier 12 can be switched in or out of the system. These switches can also be considered as optional wiring methods depending on user's needs. Multiplier 12 is a fixed multiplier. A multiplication factor of 128 by use of 7 frequency doubler sections is effective. This signal on line 15 is a frequency proportional to temperature. This signal is connected both to decade selector 16 and start controller 23. When the counter is in "reset" and ready to start to make a new count, the first cycle on line 15 actuates start controller 23 and then gate 22 is opened via line 24. The 1 MC clock 20 is connected to the counter display by various paths through switch 26 sections. (FIGURE 1 shows switch 26 in position 1.) If switch 26 is in position 4, the clock is directly connected via lines 21, 25, 29, 34 and 36, and the display proceeds to register each cycle from the 1 MC clock 20 until gate 22 closes. Stop controller 18 is connected to the decade count selector via line 17. Decade count selector 16 counts each cycle on line 15 and when the same number of cycles are counted as pre-selected, a pulse appears on line 17; then gate 22 is closed. The reading on the counter is then time proportional to transducer frequency.

The decade count selector 16 is set at a predetermined value with respect to the transducer frequency. This selector 16 setting establishes the period of count by the deviation in parts per million (p.p.m.) from the transducer frequency reference in time, usually one second. The actual time for a count is usually a fraction of one second or of ten seconds because selector 16 setting is generally set at a fraction of a period of the transducer frequency.

Comprehensive testing of mechanical oscillating materials has established that certain materials have a very stable-linear frequency change characteristic with temperature. Using these stable-linear characteristics, it is feasible to measure temperature accurately within .01° C. Initial calibration of the system is important, and certain corrections are necessary depending on temperature range. The high accuracy of repeat measurements plus the digital reading capability establishes this measurement system as very useful.

In production practice, the calibration accuracy and system features will vary. As accuracy is increased, so will cost. Novelty of this invention is intended to be based primarily on overall system novelty, flexibility novelty and a combination of components for a new use.

One type of transducer is a fork which oscillates at 345.65 c.p.s. at 0° C. and changes frequency at the rate of 181.81 p.p.m. (parts per million) per degree C. between the range of 0° C. to +30° C. For a direct readout of temperature, the decade count selector is set at 190107. The counter then reads 5,500,000 and the relationship is:

| Decade Setting | 100 |
|---|---|
| Oscillator Frequency at 0° C. | Oscillator, p.p.m./1° C. value. |

The numerals 55 on the counter display can be blocked out (XX99.999) giving 99.999° C. as the maximum reading for direct readout. Or if it is desired to exceed 99.9° C., the counter numbers for the 55 could be changed to read 00. The p.p.m. slope value for the transducer will shift slightly depending on temperature range, however a complementing decade setting can be found that will affect only the first two digits or most likely just the second digit. Many commercial applications for this system will only require high accuracy within a 20 degree range within some area between −60° C. and +80° C.

A count setting on the decade selector of 190107 would require a time interval of 550 seconds because:

$$\frac{190107}{345.65} = 550 \text{ seconds}$$

This is a longer time than generally desired. Therefore multiplier 12 is effective in decreasing the time required for each measurement. Use of a 1:128 multiplier will reduce the time to:

$$\frac{550}{128} \text{ seconds or } 4.2967 \text{ seconds}$$

however the setting of the decade selector must be changed (243333) using 345.65 cycles per second times 128 (44243.2 cycles per second) as the new oscillator frequency at zero degrees C. and this value is inserted into the previously shown relationship.

Figure 2:
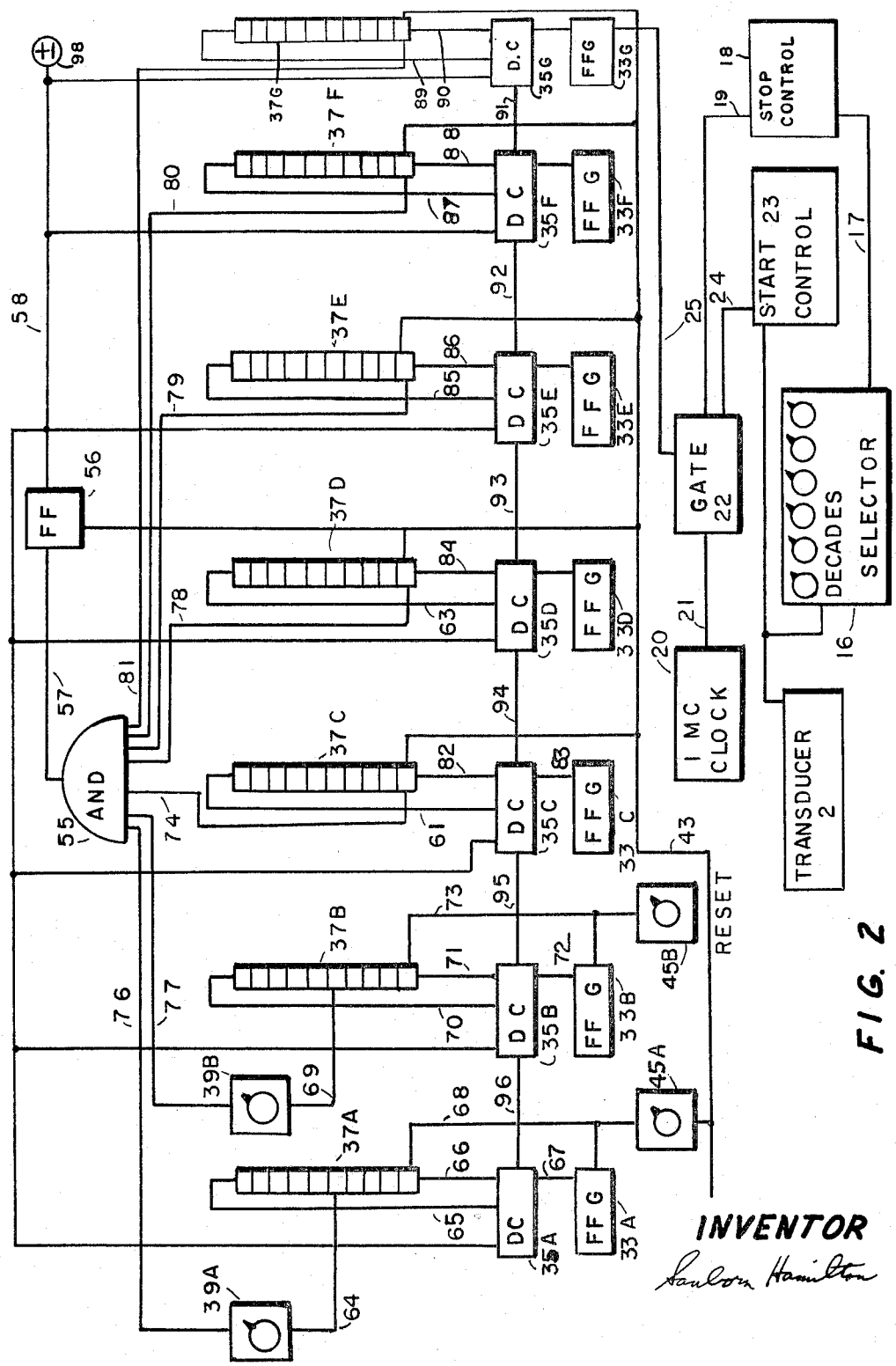
FIGURE 2 shows the electrical system which can be used in controlling the point of reset and reversing operation of the counter.

If the transducer has a positive coefficient so that when temperature increases the transducer frequency increases and if the system is calibrated to show 5500000 at 0° C., then at +1° C. the counter will read 5499000 and for −1° C. the counter will read 5501000 as a period measurement. An automatic reversing function is desired when the system crosses the 0.° C. point. When switch 26 is in position 1 or 2, the reverse transfer selector is switched on. In FIGURE 2 the outputs of each column display 37A through 37G are connected to AND circuit 55. Output of AND circuit 55 is connected via line 57 to actuate flip-flop 56. Output of flip-flop 56 is a plural line 58 which controls AND gates 35A through 35G. These AND gates 35 pick off the digital value sequence to be followed for each display column 37A through 37G. Consequently as the counter hits the 5500000 count, it can be made to reverse so that a value at or above 00000 can always be maintained. Also the starting point of the reading should be considered as a maximum plus value of $1 \times 10^6$. Thus a reading at reset should actually be 5500000 and a count down rather than up will always maintain readings at or above 0 when the automatic reversal function is used. The counter can either be marked with a custom numbering system or a custom feature can be incorporated that will insert a special reset reference value. FIGURE 1 shows reset selectors 45 which actuate in response to signals on line 43 via positions 1 and 2 of switch 26F. These reset selectors control the initial setting at reset of the first two column digits. This adjustable reset feature will generally be tied in with the direction control automatic reverse control system so a count down to 0 is initially begun and when the period count is larger than the 550000 reading the counter counts up in a positive direction after 0 is reached. Readings will be the same for either positive or negative coefficient transducers however polarity indicator 98 in FIGURE 2 must be connected to flip-flop 56 to show the correct coefficient variation as well as direction of count.

The previous several paragraphs have explained the functions of the basic components in accomplishing this reverse detection function and reset function. A somewhat more detailed explanation of connections and components in FIGURE 2 is as follows. Flip-flop group 33G is responsive to input pulses on line 25 and contains four flip-flop units responsive to pulse counts 1, 2, 4 and 8 and column display 37G is connected to these flip-flop units via lines 89 and 90 and via directional control 35G for a 0 to 9 display conversion of the 1, 2, 4 and 8 binary data of flip-flop group 33G. Output of the first decade unit 37G and 33G is connected to the second decade unit 37F and 33F and the second decade unit responds similarly to pulse counts 1, 2, 4 and 8 by a factor of 10. For every ten pulses on line 25, there is 1 pulse on line 91. Lines 87, 88, 85, 86, 61, 84, 63, 82, 70, 71, 65 and 66 are connected to their respective 10 digit display column displays and binary flip-flop group as shown in FIGURE 2, and these lines perform similarly as explained for lines 89 and 90. Also lines 92, 93, 94, 95 and 96 couple the decade units together each by a factor of 10. Lines 76, 77, 74, 78, 79, 80 and 81 are input lines to AND gate 55, and these lines are connected with each column display in such manner that a signal is produced on each line when the preselected zero value occurs during the counting display process. Line 58 is connected with all direction control units 35A through 35G for a simultaneous reversal of direction of count of succeding pulses. Lines 64 and 69 will most likely be plural lines whereby any position on the last two decade units 37A and 37B can be selected. One calibration technique that will most often be used in practice will be the reversal when all decade units hit 0000000 and the reset will be flexible in setting depending on frequency range and will most frequently be set at 5500000, 5600000 or 5400000. Actually, the highest digit need not be a display type decade unit.

Multiplier 12 is considered a precision device if a series of diode doubler circuits are used and tuned circuits inserted in each doubler section for linearization, however slight variation of a few p.p.m. (parts per million) can be observed on the counter between readings unless the counter chooses always the same wave to start count with respect to the fundamental phase and amplitude waveform. This is true because there are slight differences in time between each cycle in such a multiplier, however these time differences remain fixed. FIGURE 6 shows a multiplier used with suitable control circuitry for maintaining a precise reference of the signal train to the counter with respect to the fundamental frequency for establishing negligible error due to multiplication of frequency. Multiplier 12A in FIGURE 1 can be considered encompassing all components in FIGURE 6 except the counter 37. Multiplier 12B in FIGURE 6 does the actual frequency multiplication. Pulse shaper 160 responds to each positive swing of the fundamental frequency on line 10. Time delay control unit 164 establishes interval the flip-flop 162 is to be ON or OFF. Unit 164 sequences ON or OFF about every one second depending on the display time set into the counter and approximate time for one count. Delay control 166 is adjusted relative to the adjustment of the counter display time and is connected to control unit via line 165. Output of the pulse shaper 160 is connected via line 161 to flip-flop 162. This shaper 160 produces a narrow pulse for each cycle on line 10. To establish a pulse referenced to the same phase and amplitude of the fundamental waveform, the shaper may consist of a square wave amplifier in which the leading edge of each positive cycle is differentiated via a diode for producing this narrow pulse. When a signal initially appears on lines 161 and 163, the flip-flop 162 turns ON and the AND gate 169 is closed via line 167. Line 168 provides the constant multiple frequency which is then coupled through gate 169 to the counter via the system explained elsewhere herein. Flip-flop 162 remains ON as long as the signal remains on line 163. The duration is determined by the time it takes counter to make a count. RC values are adjusted within unit 164 for establishing this fixed time interval. FIGURE 7 shows the sequence for several sine waves of the fundamental when the counter is in the ready to count condition. The time delay unit 164 has caused a signal to appear on line 163 then the next pulse on line 161 causes the flip-flop 162 to go ON and a signal appears then on line 167. In FIGURE 8, the signal train is shown to appear on line 159 when line 167 is energized. Time ON ($t_{on}$) as shown for unit 164, flip-flop 162 and AND gate 169 is essentially the same. It is also shown that the counter leads gate 169 by a short period. Prior to appearance of a signal on line 13, the counter will remain static and will be locked in time to unit 164. Time $t_{on}$=time for counter to make a count +.1 to .5 second. Time $t_{off}$=counter display time +.1 to .5 second.

In some installations, it may be desirable to correct the temperature reading error caused by system dynamics such as transducer response delay, boundary wall temperature, friction effect of boundary layers surrounding probe responsive to flow rate and pressure, and other terms related to convection, radiation and conduction of heat. The transducer may well have a mass of only 3 to 9 ounces, however a temporary error, due to such mass, can still prevail. Rate correction computer 30 as shown in FIGURE 1 is shown in more detail in FIGURE 3. Shift register 105 records the cycles during first measuring period. The data is recorded as digital binary information. The sequence controller 111 after a short time interval A less than 0.05 second, will cause data in shift register 105 to be transferred to storage unit 106. Time interval B for this second transfer should be less than 0.05 second. Connections 107 can either be parallel or serial connections depending on design of conventional units 105 and 106 for maintaining less than 0.05 second transfer for time interval B. Digital subtractor 115 compares the difference between values registered in units 105 and 106 for two consecutive data measuring periods. This difference value is fed into adder 117 via line 116. Adder 117 adds this difference rate signal on line 116 to the last digital measurement period value whereby the output data on line 119 is modified so that the actual count display will be corrected to overcome transducer damping error. Correction factor unit 130 is inserted between the output of subtractor 115 and adder 117. This correction factor unit 130 is essentially a digital multiplier which multiplies the binary digital value at the output of subtractor 115 by a factor determined by the transducer damping characteristic. If for instance a rate of five degrees per minute change is predetermined to mean a ten degree difference between external temperature of the transducer and inside temperature, then a factor of two exists for this particular type of transducer and unit 130 would be permanently set at 2 and the binary digital rate signal on line 116 would contain this times two correction factor. Subtractor 115 has also polarity difference detection capability, and this polarity information is connected with adder 117 causing adder 117 to either subtract or add data on lines 118 and 116. Adder 117 is connected to storage unit 120 via line 119. Storage unit 120 is inserted for reducing system time delay. The count display in many conventional counters is serial information input wherein the speed is coincident with counter input cycles and/or clock. Storage unit 120 provides serial input to the count display 122 and allows system measurement to continue during display time. Display time control is determined by manual control 111 and is connected via line 104 to the sequence controller 110 as one control signal for this controller 110. Sequence controller 110 is comprised of various timing circuits, clock circuit and erase reset circuitry for maintaining various parts of this rate computer performing at the proper speed and interval. Line 131 is an input signal controlling the start of the subtraction computation. Line 132 causes register 105 to shift all data into storage unit 106. Line 133 causes erase of data in storage unit 106 prior to transfer of new data into this unit. Line 109 dictates time that subtractor 115 is to compute. Line 113 dictates when adder 117 is to compute. Line 114 dictates time that storage unit 120 releases data to count display 122. Also in FIGURE 3 is shown a time sequence chart for the various previously explained operations. Lines 108, 118, 116 and 119 are either serial or parallel entry wiring depending on specific design of units 105, 106, 115, 130, 117 and 120. System speed should be less than 0.2 second for all operations except gate 22 open and close time and count display unit 122 counting time and display time. The higher speed characteristic of parallel entry may warrant parallel connections as the preferred method.

FIGURE 9 shows the waveforms for the rate computer explained previously for FIGURE 3.

Waveform 123 shows the time that sequence gate 22 is ON and counting is occurring. Plus condition of waveforms 123, 124, 125, 127, 128 and 129 indicates ON time for associated parts of each system or signal. While gate 22 is ON, the storage register 105 is counting as shown by the dotted lines for waveform 124. Waveform 125 shows time that subtraction of information occurs when each count is completed. Waveform 126 shows time that storage unit 106 stores the count received by shift register 105. Waveform 126 shows time the previous information is erased from storage register 106. A slight delay exists between the rising edge of waveform 126 and lagging edge of waveform 124 to allow storage register 105 to transfer new data to storage register 106 before reset of register 105. Waveform 127 shows time at which adder 117 responds to data from shift register 105 and subtractor 115. Waveform 128 shows time when storage unit 120 responds, and is shown to respond when adder 117 has finished its computation, designated by rising dotted lines in waveform 127. When the dotted line has reached the top of each wave, the process of obtaining a complete count is accomplished. This is true for all dotted lines shown in waveforms 124, 126, 127, 128 and 129. Count display timing is shown in waveform 129 wherein count is shown to begin when complete storage occurs in storage unit 120.

Detailed description of means for correcting error due to one system heat dynamics factor has been previously explained, however this patent is not intended to be limited to this specific factor. Input to unit 130 can readily be adapted to be responsive to binary data representing other singular or a resultant plurality of data related to these previously mentioned dynamic errors.

In FIGURE 4 a fork 2 is shown within a frame housing 135. Material of this frame housing will vary depending on type solution-environmental exposure-chemical nature of the substance within container 1. Coils 134 and 136 drive fork and detect the oscillation frequency of fork. Bolt 138 ties fork to the frame. Weight and material of 2, 135, 138, 134 and 136 are selected for minimum temperature response delay and maximum thermal conductivity. Frame 135 will be both a protective housing for the transducer thermal conductor as well as a vibration support. Open space around the mechanical oscillating component may be a gas of superior thermal conductivity when fast system response is desired with minimum error. Helium gas having seven times greater thermal conductivity than air will be used in some applications to good advantage. Stem 3 is constructed to be small in diameter yet of sufficient strength to support frame 135 to piece 140. Cable 6 connects with coils 134 and 136 via stem 3. Threaded piece 140 will normally fit the threaded insert in the wall of the container. Knob 5 is adjusted corresponding with dial 4 for calibration of the fork with respect to slope selection of selector 16 with comparison to a precision temperature reference checked by the Bureau of Standards. Rotation of knob 5 will cause a shift of the frame 135 and fork 2 thus causing a change of gravity effect on the inertia of the fork consequently shifting the frequency of the fork. The magnitude of shift will remain constant independent of temperature.

In FIGURE 5, the operation is similar for the reed as for the fork. Reed 141 is supported by bolt 142 by housing 143 and the reed 141 is driven electrically by coil 146, and the frequency signal is picked up by coil 147. A regenerative loop amplifier 7 keeps these mechanical oscillators continually in oscillation. Stem 144 connects housing 143 and cable 149 and supports the system firmly to the container wall. Threaded piece 150 screws into container wall by suitable threaded opening. Dial 145 and knob 148 establish calibration of the reed with respect to gravity as explained previously.

In the assembly of both the fork and reed, the position of the oscillating component is such that maximum variation of frequency with rotation of knobs 5 and 148 can be accomplished.

The reed 141 layout is such that transverse vibration is intended to predominate for maximum gravity effect. However this invention is not intended to be limited to these specific layouts or methods of driving these mechanical elements. Drive techniques are expected to vary with desired frequency range, length of oscillator material, desired p.p.m. (parts per million) change per degree centigrade, type of oscillating material and method of support. Also the need for a layout for maximum gravity effect on frequency is expected to vary, thus the configuration of stem and transducer housing may vary.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. Apparatus for measuring temperature and direct digital display of temperature comprising a temperature sensitive transducer producing an output frequency proportional to temperature, a period counter having period setting controls, said transducer connected with said counter, said period controls set proportional to the transducer signal p.p.m. (parts per million) slope characteristic, a rate correction computer, said rate correction computer output connected with said counter, said rate correction computer responsive to difference value of consecutive period readings, and said counter display responsive to period measurement value and rate correction value for direct digital display of temperature of transducer with time constant correction.

2. Apparatus as claimed in claim 1 wherein said rate correction computer comprises a digital subtraction computer for determining difference between two consecutive period readings, adder, output of said subtraction computer connected with said adder, and said adder responsive to the difference signal from said subtraction computer and most recent period measurement signal.

3. Apparatus in claim 1 wherein a multiplier unit is connected between said transducer and said counter so that digits of measurement and accuracy can be increased.

4. Apparatus in claim 1 wherein said period counter has adjustable means for reset digital display whereby countdown can be started above zero at a specific preadjusted value.

5. Apparatus in claim 1 wherein said period counter has automatic reverse counting ability so that counter display reading is maintained as direct reading of temperature.

6. Apparatus for measuring temperature and direct digital display of temeprature comprising a temperature sensitive transducer producing an output frequency proportional to temperature, a period counter having period setting controls, said transducer connected with said counter, said period controls set proportional to the transducer signal p.p.m. (parts per million) slope characteristic, said counter responsive to the frequency signal of said transducer for display of temperature by period interval measurement, and said counter having also automatic reverse counting ability so that counter display reading is maintained as direct reading of temperature.

7. Apparatus as claimed in claim 6 wherein said period counter has adjustable means for reset digital display whereby countdown can be started above zero at a specific pre-adjusted value.

8. Apparatus for measuring temperature and direct digital display of temperature comprising a temperature sensitive transducer producing an output frequency proportional to temperature, a counter having period setting controls, said transducer connected with said counter, said period controls set proportional to the transducer signal p.p.m. (parts per million) slope characteristic, said counter responsive to the frequency signal of said transducer for display of temperature by period interval measurement, said period counter having automatic reverse counting ability so that counter display reading is maintained as direct reading of temperature, and said period counter having adjustable means for reset digital display whereby countdown can be started above zero at a specific preadjusted value.

9. Apparatus in claim 8 wherein a multiplier unit is connected between said transducer and said counter so that digits of measurement and accuracy can be increased.

10. Apparatus in claim 8 wherein said transducer is mounted on a rotary support for changing the gravitational index within said transducer for changing the frequency calibration of said transducer.

11. Apparatus in claim 8 wherein said transducer is a small tuning fork, said fork enclosed within a sealed probe.

12. Apparatus in claim 8 wherein said transducer is a reed oscillator, and said reed oscillator enclosed within a sealed probe.

13. Apparatus in claim 8 wherein a frequency multiplier unit is connected between said transducer and said counter, said multiplier having sequence control circuitry for synchronizing the starting point of the multiplier output signal train with the fundamental frequency phase and amplitude.

14. Apparatus for measuring temperature and direct digital display of temperature comprising a temperature sensitive transducer, a frequency multiplier, a control circuit, an AND gate, a counter, output signal of said transducer connected with the input of said multiplier, output of said multiplier is connected with the first input of the AND gate, said control circuit responsive to the output of said transducer in respect to phase and amplitude waveform, output of said control circuit connected as the second input of the AND gate, output of AND gate connected with said counter so the multiple frequency count begins always at the same point with respect to the fundamental frequency phase and amplitude waveform.

15. Apparatus as in claim 14 wherein the control circuit comprises an adjustable time interval control for changing the AND gate off time relative to counter display time so that the AND gate output multiple frequency signal always commences after counter is ready to count.

16. Apparatus for measuring temperature and direct digital display of temperature comprising a temperature sensitive transducer producing an output frequency proportional to temperature, a period counter having period setting controls, said transducer connected with said counter, said period controls set proportional to the transducer signal p.p.m. (parts per million) slope characteristic, a heat dynamics correction computer, said dynamics correction computer responsive to data representing factors which affect dynamic error in temperature measurement, said correction computer responsive to said data causing an output signal in proportion to present scaling factors, said correction computer output connected with said counter, and counter display responsive to period measurement value and dynamics error correction value for direct digital display of temperature of transducer with heat transfer dynamics correction.

17. Apparatus for measuring temperature and direct digital display of temperature comprising a temperature sensitive transducer producing an output frequency proportional to temperature, a counter having period setting controls, said transducer connected with said counter, said period controls set proportional to the transducer signal p.p.m. (parts per million) slope characteristic, said counter responsive to the frequency signal of said transducer for display of temperature by period interval measurement, said period counter having automatic reverse counting ability so that counter display reading is maintained as direct reading of temperature, said period counter having adjustable means for reset digital display whereby countdown can be started above zero at a specific preadjusted value, sealed probe, said transducer contained within said sealed probe, and said sealed probe containing helium gas for high thermal conductivity.

18. Apparatus for measuring temperature and direct digital display of temperature comprising a temperature sensitive transducer producing a fundamental frequency proportional to temperature, a frequency multiplier, fundamental frequency signal of said transducer connected to the input of said multiplier, an AND gate, a control circuit, the multiplied frequency signal output of said multiplier connected to input of said AND gate, said control circuit input connected with said transducer and responsive to the fundamental frequency signal output, said control circuit connected to said AND gate, and said AND gate responsive to signals from said control circuit and multiplier so that the gate output signal always is the multiple frequency and initially commences at the same point with respect to fundamental frequency phase and amplitude.

References Cited by the Examiner
UNITED STATES PATENTS

| | | | |
|---|---|---|---|
| 2,496,975 | 2/1950 | Bach | 73—362 |
| 2,582,232 | 1/1952 | Cesaro | 73—339 |
| 2,933,644 | 4/1960 | Hupp | 312—84.5 |
| 3,187,575 | 6/1965 | Stoliar | 73—355 |

LOUIS R. PRINCE, *Primary Examiner.*

DAVID SCHONBERG, *Examiner.*

D. McGIEHAN, *Assistant Examiner.*